United States Patent
Nguyen

(10) Patent No.: US 9,188,231 B2
(45) Date of Patent: Nov. 17, 2015

(54) SLEEVE SEAL FOR GATE VALVES

(75) Inventor: Viet Nguyen, Reno, NV (US)

(73) Assignee: Pentair Valves & Controls US LP, Minneapolis, MN (US)

( * ) Notice: Subject to any disclaimer, the term of this patent is extended or adjusted under 35 U.S.C. 154(b) by 858 days.

(21) Appl. No.: 13/234,302

(22) Filed: Sep. 16, 2011

(65) Prior Publication Data

US 2012/0068101 A1  Mar. 22, 2012

Related U.S. Application Data

(60) Provisional application No. 61/383,428, filed on Sep. 16, 2010.

(51) Int. Cl.
*F16K 3/02* (2006.01)
*F16J 15/12* (2006.01)
*F16K 3/06* (2006.01)

(52) U.S. Cl.
CPC ............. *F16K 3/0281* (2013.01); *F16J 15/121* (2013.01); *F16K 3/0227* (2013.01); *F16K 3/06* (2013.01)

(58) Field of Classification Search
CPC ... F16K 27/044; F16K 3/0227; F16K 3/0281; F16K 3/06; F16J 15/121
USPC .................. 251/174, 195, 326–328; 137/375; 277/627, 651
See application file for complete search history.

(56) References Cited

U.S. PATENT DOCUMENTS

| | | | |
|---|---|---|---|
| 3,333,816 A * | 8/1967 | Williams et al. ............... | 251/327 |
| 3,353,784 A | 11/1967 | Grove | |
| 4,345,739 A | 8/1982 | Wheatly | |
| 4,895,181 A | 1/1990 | McKavanagh | |
| 5,150,881 A | 9/1992 | McKavanagh | |
| 5,330,158 A * | 7/1994 | Ellich et al. ................... | 251/327 |

FOREIGN PATENT DOCUMENTS

| CN | 1615413 | 5/2005 |
|---|---|---|
| JP | 2004124997 A | 4/2004 |

* cited by examiner

*Primary Examiner* — Marina Tietjen
(74) *Attorney, Agent, or Firm* — Quarles & Brady LLP

(57) ABSTRACT

A gate valve sleeve including a reinforced elastomeric valve sleeve member with an integrally molded reinforcing member disposed therein. In one embodiment, the reinforcing member comprises a pair of parallel spaced ring elements connected by a plurality of spacers. In another embodiment, the reinforcing member comprises first and second ring member abutted to form a T-shape. In a further embodiment, the reinforcing member comprises a ring and a plurality of axially oriented spacer members. In yet a further embodiment, the reinforcing member comprises a pair of ring elements connected by a plurality of pins. The pins are fixed to one of the ring elements and are slidably engageable with the other ring element. In an alternate embodiment, an auxiliary ring member is located within an interior opening of the reinforcing member.

15 Claims, 13 Drawing Sheets

Gate in Open Position

Gate in Open Position

Gate in Closed Position

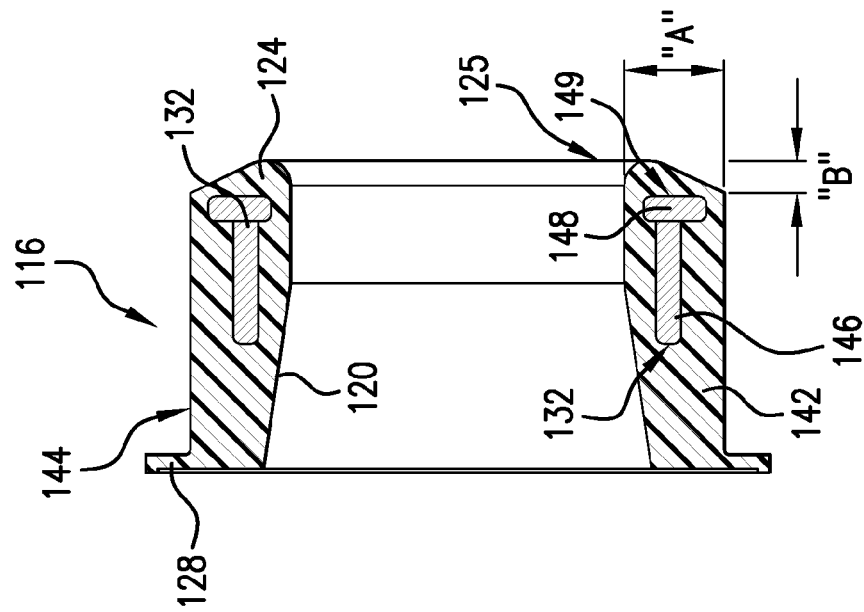
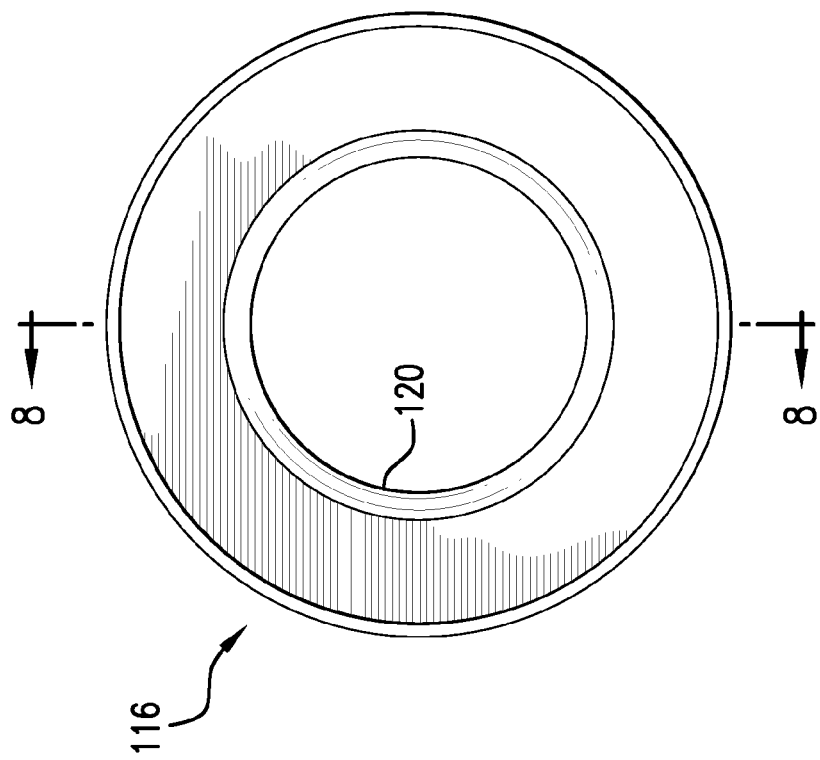

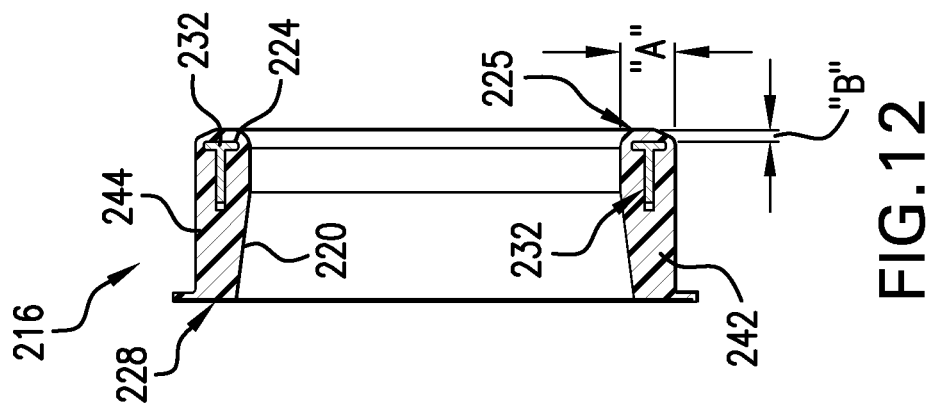
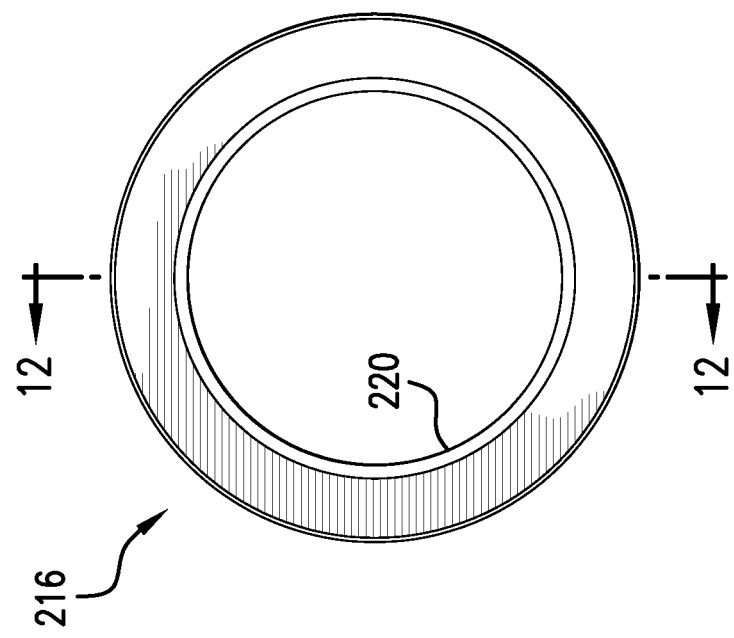
FIG. 12
FIG. 11

SLEEVE SEAL FOR GATE VALVES

CROSS REFERENCE TO RELATED APPLICATIONS

This application claims the benefit under 35 U.S.C. §119 (e) of U.S. Provisional Application No. 61/383,428 entitled IMPROVED SLEEVE SEAL FOR GATE VALVES, filed on Sep. 16, 2010 which is incorporated herein by reference in its entirety and to which this application claims the benefit of priority.

FIELD OF THE INVENTION

This invention relates to a sleeve seal for a gate valve, and more particularly, to a gate valve sleeve including a reinforced elastomeric valve sleeve member with an integrally molded reinforcing member disposed therein.

BACKGROUND

Gate valves are used in fluid handling applications when a straight-line flow of fluid with minimum restriction is desired. A gate, or disc, engages a pair of opposed seals when the valve is in the closed position to shut off the straight-line flow. When the gate is lifted, configuring the valve in the open position, fluid is able to flow freely between the inlet and outlet ports of the valve. As designed, gate valves are typically operated in either the fully open or fully closed position.

In some cases, the opposed seals are metal, and the gate is either metal or non-metallic. As can be appreciated, the disadvantage of such metallic seal configurations is that they can result in substantial short term wear of the gate and/or seals.

In other cases, the opposed seals are elastomeric and the gate is metal. With such arrangements, the seals operate to provide a resilient seal against the gate. The problem with such elastomeric seal arrangements, however, is that the portion of the soft elastomeric material which engages the gate can abrade as the gate moves between the open and closed positions. As the gate cycles through the sleeve, it can rip off the nose, split the sleeve open, or cut chunks away so that eventually the valve leaks. Attempts have been made to reinforce the elastomeric seals, but providing too much rigidity/support for the nose can also accelerate wear of the seals.

Thus, there is a need for an improved reinforcement configuration for elastomeric seals used in gate valve applications. The configuration should provide a balance in stiffness and flexibility so that the resulting seal has an increased life expectancy as compared to current seals.

SUMMARY

An embodiment of a gate valve sleeve is disclosed, comprising a cylindrical sleeve member having a nose portion disposed at one end; and a reinforcing member disposed within the cylindrical sleeve member. The reinforcing member comprises first and second spaced apart ring members connected by a plurality of spacer members. One of the first and second spaced apart ring members is positioned adjacent to the nose portion.

An embodiment of a gate valve is disclosed, comprising a body, a valve disc, and a pair of cylindrical sleeve members. Each cylindrical sleeve member of the pair of cylindrical sleeve members has an elastomeric sleeve with a nose portion disposed at one end, and a reinforcing member disposed within the elastomeric sleeve. The reinforcing member may include first and second spaced apart ring members connected by a plurality of spacer members. The pair of cylindrical sleeve members are positioned within the valve body such that their respective nose portions oppose each other. The pair of nose portions further are positioned such that when the valve is in an open position the nose portions engage each other to seal a fluid passageway within the valve, and when the valve is in a closed position the nose portions engage opposite sides of the valve disc to prevent fluid flow from an inlet port of the valve to an outlet port of the valve.

A second embodiment of a gate valve sleeve is also disclosed, comprising a cylindrical sleeve member having a nose portion disposed at one end, and a reinforcing member disposed within the cylindrical sleeve member. The reinforcing member includes first and second ring members abutted to form a T-shape in cross-section, and one of the first and second ring members is positioned adjacent to the nose portion.

A second embodiment of a gate valve is disclosed, comprising, a body, a valve disc, and a pair of cylindrical sleeve members. Each cylindrical sleeve member of the pair of cylindrical sleeve members includes an elastomeric sleeve having a nose portion disposed at one end, and a reinforcing member disposed within the elastomeric sleeve. The reinforcing member includes first and second ring members abutted to form a T-shape in cross-section. The pair of cylindrical sleeve members are positioned within the valve body such that their respective nose portions oppose each other. The pair of nose portions further are positioned such that when the valve is in an open position the nose portions engage each other to seal a fluid passageway within the valve, and when the valve is in a closed position the nose portions engage opposite sides of the valve disc to prevent fluid flow from an inlet port of the valve to an outlet port of the valve.

A third embodiment of a gate valve sleeve is disclosed, comprising a cylindrical sleeve member having a nose portion disposed at one end; and a reinforcing member disposed within the cylindrical sleeve member. The reinforcing member comprises a ring member engaged with a plurality of axially oriented spacer members. The reinforcing member is positioned a first axial distance away from a surface of the nose portion such that a ratio of the first axial distance and a thickness of the nose portion is in a range of about 20% to about 50%.

A third embodiment of a gate valve is disclosed, comprising a body, a valve disc, and a pair of cylindrical sleeve members. Each cylindrical sleeve member of the pair of cylindrical sleeve members includes an elastomeric sleeve having a nose portion disposed at one end, and a reinforcing member disposed within the elastomeric sleeve. The reinforcing member comprises a ring member engaged with a plurality of axially oriented spacer members. The reinforcing member is positioned a first axial distance away from a surface of the nose portion such that a ratio of the first axial distance and a thickness of the nose portion is in a range of about 20% to about 50%. The pair of cylindrical sleeve members are positioned within the valve body such that their respective nose portions oppose each other. The pair of nose portions further are positioned such that when the valve is in an open position the nose portions engage each other to seal a fluid passageway within the valve, and when the valve is in a closed position the nose portions engage opposite sides of the valve disc to prevent fluid flow from an inlet port of the valve to an outlet port of the valve.

A fourth embodiment of a gate valve sleeve is disclosed, comprising a cylindrical sleeve member having a nose portion disposed at one end; and a reinforcing member disposed within the cylindrical sleeve member. The reinforcing member comprises first and second spaced apart ring members connected by a plurality of pins. The first spaced apart ring member is fixed to the plurality of pins and the second spaced apart ring member is slidably engageable with said plurality of pins. One of the first and second spaced apart ring members is positioned adjacent to the nose portion.

A fourth embodiment of a gate valve is disclosed, comprising, a body, a valve disc, and a pair of cylindrical sleeve members. Each cylindrical sleeve member of the pair of cylindrical sleeve members includes an elastomeric sleeve having a nose portion disposed at one end, and a reinforcing member disposed within the elastomeric sleeve. The reinforcing member comprises first and second spaced apart ring members connected by a plurality of pins. The first spaced apart ring member is fixed to the plurality of pins and the second spaced apart ring member is slidably engageable with the plurality of pins. The pair of cylindrical sleeve members are positioned within the valve body such that their respective nose portions oppose each other. The pair of nose portions further are positioned such that when the valve is in an open position the nose portions engage each other to seal a fluid passageway within the valve, and when the valve is in a closed position the nose portions engage opposite sides of the valve disc to prevent fluid flow from an inlet port of the valve to an outlet port of the valve.

A fifth embodiment of the gate valve sleeve is disclosed, comprising a cylindrical sleeve member having a nose portion disposed at one end; and a reinforcing member and an auxiliary ring member disposed within the cylindrical sleeve member. The reinforcing member comprises a ring member engaged with a plurality of axially oriented spacer members. The ring member includes an interior opening forming an interior surface. The auxiliary ring member includes an outer surface located within the interior opening to form a slip fit arrangement between the reinforcing member and the auxiliary ring member.

A fifth embodiment of a gate valve is disclosed, comprising, a body, a valve disc, and a pair of cylindrical sleeve members. Each cylindrical sleeve member of the pair of cylindrical sleeve members includes an elastomeric sleeve having a nose portion disposed at one end. Each elastomeric sleeve includes a reinforcing member and auxiliary ring member. The reinforcing member comprises a ring member engaged with a plurality of axially oriented spacer members wherein the ring member includes an interior opening forming an interior surface. The auxiliary ring member includes an outer surface located within the interior opening to form a slip fit arrangement between the reinforcing member and the auxiliary ring member. The reinforcing member is positioned a first axial distance away from a surface of the nose portion such that a ratio of the first axial distance and a thickness of the nose portion is in a range of about 20% to about 50%. The pair of cylindrical sleeve members are positioned within the valve body such that their respective nose portions oppose each other. The pair of nose portions further are positioned such that when the valve is in an open position the nose portions engage each other to seal a fluid passageway within the valve, and when the valve is in a closed position the nose portions engage opposite sides of the valve disc to prevent fluid flow from an inlet port of the valve to an outlet port of the valve.

BRIEF DESCRIPTION OF THE DRAWINGS

By way of example, a specific embodiment of the disclosed device will now be described, with reference to the accompanying drawings:

FIG. 7 is an end view of a second embodiment of the disclosed sleeve seal;

FIG. 8 is a cross-sectional view of the sleeve seal of FIG. 7, taken along line 8-8;

FIG. 11 is an end view of a third embodiment of the disclosed sleeve seal;

FIG. 12 is a cross-sectional view of the sleeve seal of FIG. 11, taken along line 12-12;

DETAILED DESCRIPTION

Figure 1:
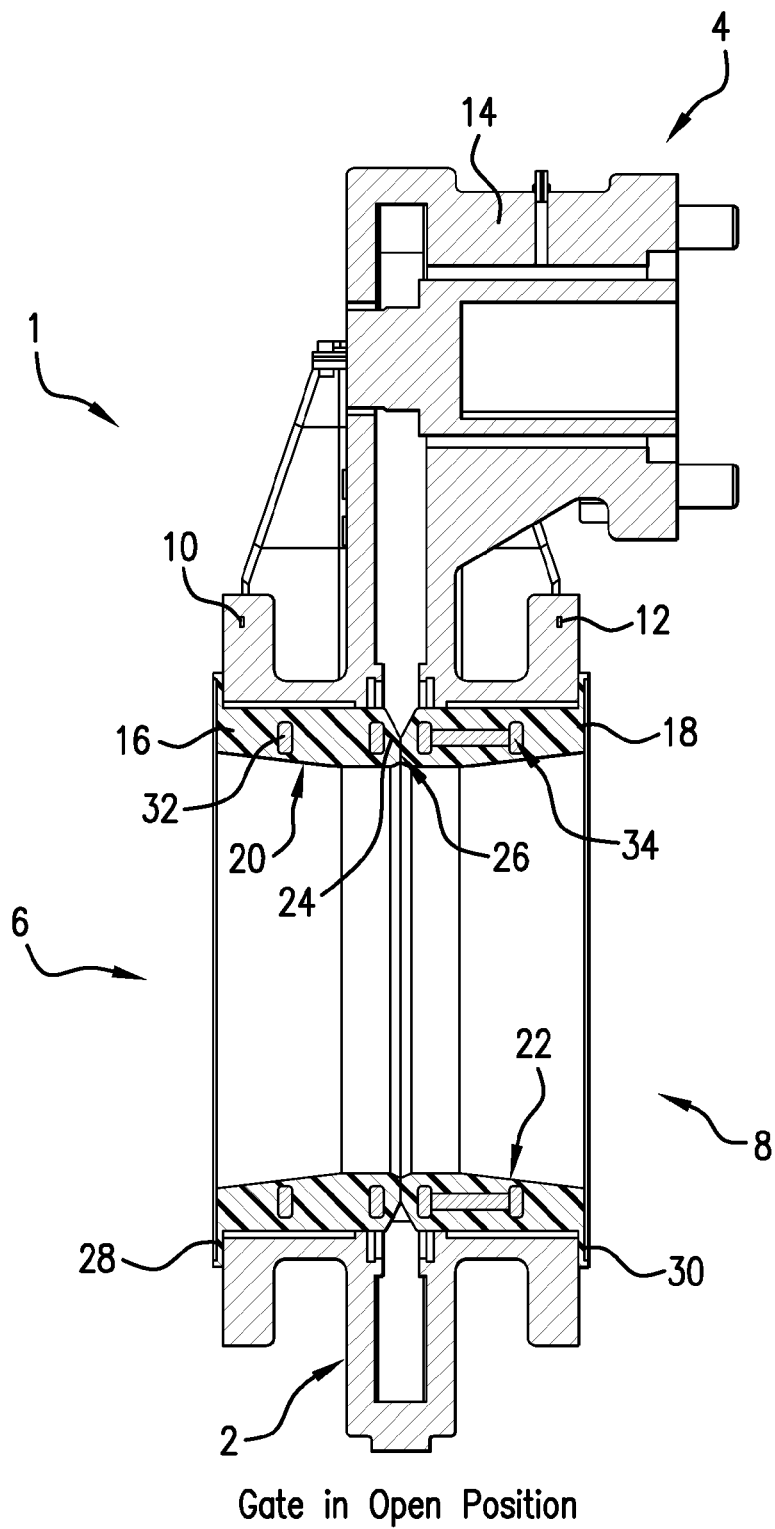
FIG. 1 is a cross-sectional view of an exemplary gate valve incorporating the disclosed reinforced sleeve seal, in which the valve in the open position.

Before any embodiments of the invention are explained in detail, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-24B.

Referring to FIG. 1, an exemplary gate valve 1 is shown having a body 2, a bonnet 4, an inlet port 6, an outlet port 8, and a fluid flow bore 6. The inlet and outlet ports 6, 8 may have respective flanges 10, 12 for fixing the valve 1 within an associated piping system (not shown). The bonnet 4 may include an actuating mechanism 14 configured to operate the valve through hydraulic, pneumatic, electric, geared or other power arrangement.

As can be seen, the gate valve 1 includes first and second sleeve members 16, 18, each of which is received within a respective inlet or outlet port 6, 8 of the valve 1. The first and second sleeve members 16, 18 are each of a generally cylindrical configuration such that the inner surfaces 20, 22 of the sleeves serve as the fluid flow bore 6 of the assembled valve.

The first and second sleeve members 16, 18 each have a nose portion 24, 26 disposed at one end of the sleeve. Due to the position of the sleeves within the valve body, these nose portions 24, 26 are compressed against each other when the valve 1 is in the open position. This compressed arrangement seals the fluid flow bore 6 when the valve is in the full open position so that operating fluid from the bore does not leak into the valve body 2 or bonnet 4.

The first and second sleeve members 16, 18 further each have a flange portion 28, 30 that is sandwiched between the respective flange 10, 12 and a flange (not shown) of an associated piping system component. As configured, the flange portions 28, 30 of the sleeve members 16, 18 serve both to fix the sleeves within the valve 1, and to seal the valve flanges 10, 12 to the associated piping system components.

Also visible in the cross-section of the sleeve members 16, 18, are the reinforcing members 32, 34, which will be described in greater detail later.

Figure 2:
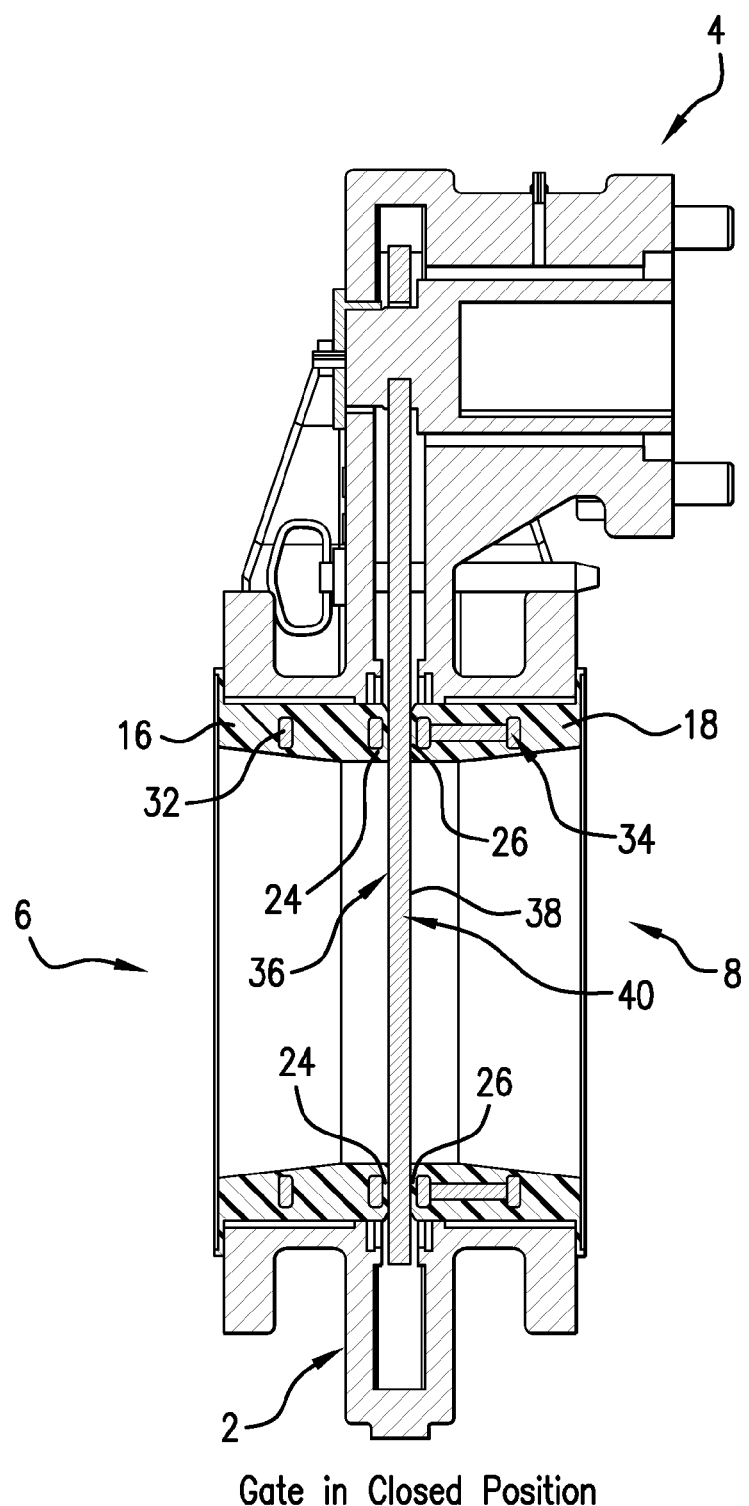
FIG. 2 is a cross-sectional view of the exemplary gate valve of FIG. 1 in which the valve is in the closed position.

As the valve is being closed, the gate 40 splits the sleeves, pushing the nose portions 26, 24 away from each other, and resulting in the configuration shown in FIG. 2. In this configuration (the full closed position), the nose portions 26, 24 of the first and second sleeve members 16, 18 are compressed against opposing sides 36, 38 of the gate 40 to seal the inlet port 6 from the outlet port 8, cutting off flow between the two. In addition to cutting off flow, the sealing arrangement also prevents operating fluid from migrating to other portions of the valve body and bonnet.

Figure 4:
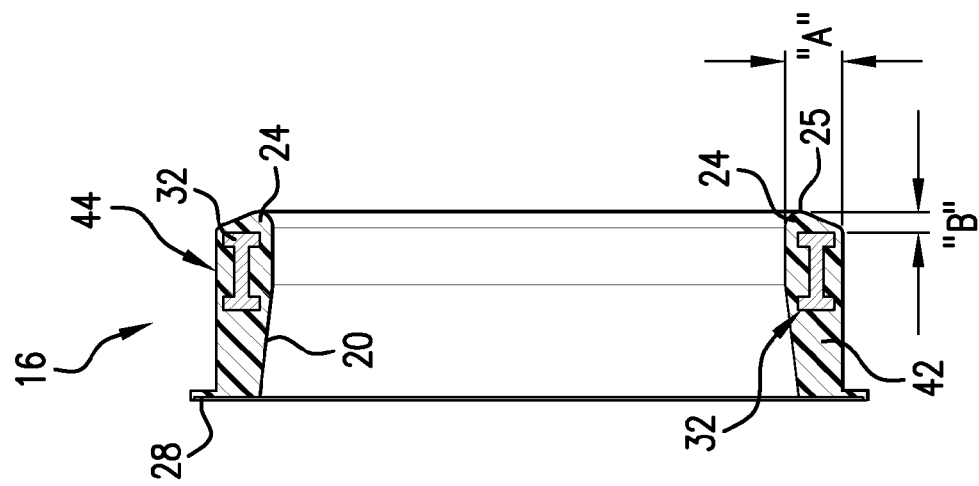
FIG. 4 is a cross-sectional view of the sleeve seal of FIG. 3, taken along line 4-4.
Figure 3:
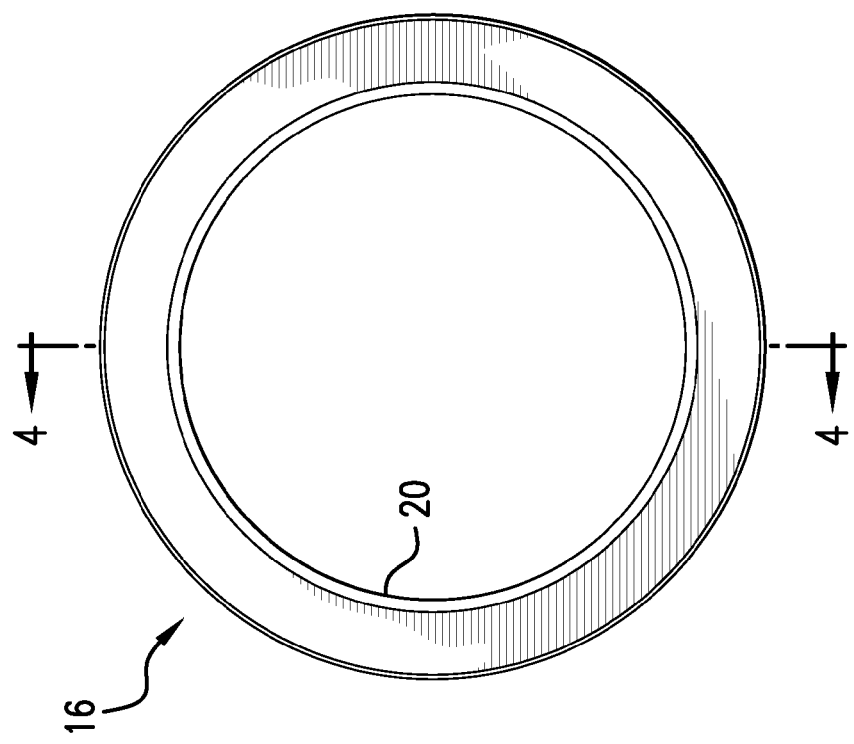
FIG. 3 is an end view of a first embodiment of the disclosed sleeve seal.

FIGS. 3 and 4 show isolated views of one of the first and second sleeve members 16, 18. Although the description will proceed in relation to the first sleeve member 16, it will be appreciated that the description applies equally to the second sleeve member 18.

The first sleeve member 16 comprises an elastomeric sleeve 42 in combination with a reinforcing member 32. In the illustrated embodiment, the nose portion 24, the flange portion 28 and the inner surface 20 are formed by the elastomeric sleeve 42. The reinforcing member 32 is embedded (e.g., via a molding process) within the elastomeric sleeve 42 adjacent to the nose portion 24 to provide a desired enhanced stiffness to the nose portion 24.

As illustrated, the nose portion 24 has a thickness "A," and the reinforcing member 32 is positioned a distance "B" from a front surface 25 of the nose portion. In accordance with the invention, it has been determined that providing the sleeve member 16 with a B/A ratio of from about 20% to about 50% provides a desired enhanced life cycle for the sleeve. This ratio can vary, within the stated range, depending upon the elastomeric compound used to form the elastomeric sleeve 42, the pressure rating of the sleeve, and the thickness of the gate 40. Thus, exemplary B/A values, by nominal pipe size (NPS), are about 34% for 6 inch NPS, about 37% for 8 inch NPS, about 22% for 16-inch NPS, and about 48% for 32-inch NPS.

To provide an appropriate fit of the sleeve member 16 within the valve body 2, the outer surface 44 of the elastomeric sleeve 42 is sized and configured to engage at least a portion of an inner surface of the body.

Figure 6:
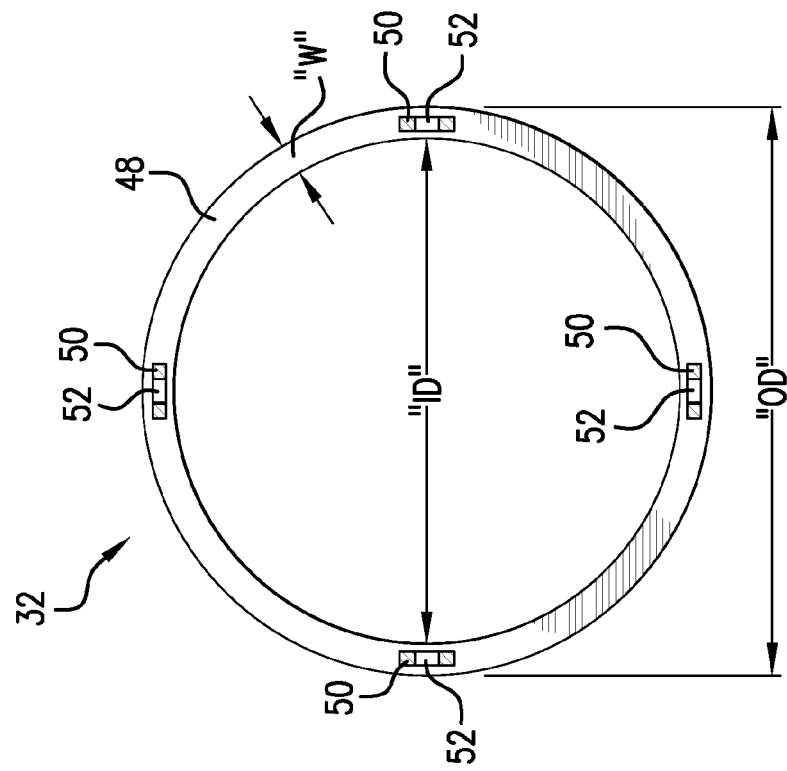
FIG. 6 is a cross-sectional view of the reinforcing member of FIG. 5, taken along line 6-6.
Figure 5:
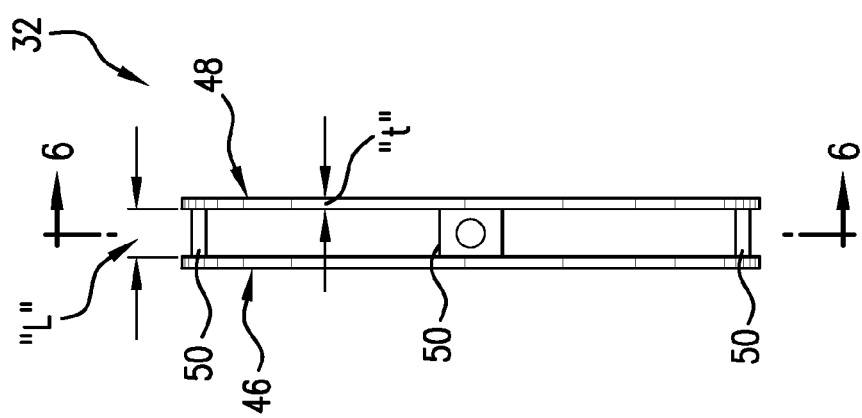
FIG. 5 is a side view of a reinforcing member of the sleeve seal of FIG. 3.

FIGS. 5 and 6 show isolated views of the reinforcing member 32. In the illustrated embodiment, the reinforcing member 32 is composed of a plurality of elements, including first and second spaced-apart ring members 46, 48 and a plurality of spacer members 50.

Each of the ring members 46, 48 has an inside diameter "ID," an outside diameter "OD," a width "W" and a thickness "t" sized to provide a desired degree of transverse stiffness to the resulting sleeve member 16. To provide a desired degree of axial stiffness to the sleeve member 16, the first and second ring members 46, 48, are connected by the plurality of spacer members 50, which are positioned at discrete locations about the ring members 46, 48.

The spacer members have a length "L" to provide a desired offset distance between the first and second ring members 46, 48. The illustrated spacer members 50 comprise discrete plate elements having associated holes 52 disposed therein. The holes 52 may facilitate alignment of the reinforcing member 32 within the mold during manufacture when the reinforcing member 32 is molded within the elastomeric sleeve 42.

In the illustrated embodiment, the first and second ring members 46, 48 are connected by four individual spacer members 50 positioned at 90-degree intervals. It will be appreciated that greater or fewer numbers of spacers can be used to provide a desired degree of axial stiffness to the sleeve member 16.

Providing the spacers 50 at 90-degree intervals enables the sleeve member 16 to flex axially (i.e., parallel to the direction of flow through the bore 6) when the valve 1 is cycled between the open and closed positions. This flexure occurs because the portions of the rings 46, 48 located between the spacers 50 are able to flex slightly upon the application of an axial force to the nose portions 22, 24. The amount of flexure allowed can be controlled during manufacture by changing one or more of the ring and/or spacer dimensions, and by adjusting the number and placement of the spacers 50. An additional degree of adjustability can also be provided by positioning the reinforcing member 32 at a desired offset distance from the nose portion of the sleeve member 16.

In accordance with the invention, it has been found that allowing the sleeve member 16 to flex slightly in the axial direction (as opposed to providing either a completely elastic or a completely rigid seal) can improve the life cycle of the sleeves as compared to prior designs. As disclosed, the sleeve seal design provides a balanced reinforcement scheme that can be adjusted (by adjusting the aforementioned parameters) to suit a particular application.

The elastomeric sleeve 42 can be made of any of a variety of elastomeric materials used for fluid system applications. The reinforcing member 32 can be made from hot rolled steel, or other metal as appropriate. It is also contemplated that the reinforcing member 32 could be made from a non-metallic material such as a polymer.

Referring now to FIGS. 7-10, a second embodiment of a sleeve member 116 for use in the valve of FIGS. 1 and 2 is shown incorporating an alternative reinforcing arrangement. As with the previous embodiment, the description will proceed in relation to the first sleeve member 116, though the description applies equally to the second sleeve member.

The sleeve member 116 of FIGS. 7 and 8 comprises an elastomeric sleeve 142 in combination with a reinforcing member 132. In the illustrated embodiment, the nose portion 124, the flange portion 128 and the inner surface 120 are formed by the elastomeric sleeve 142. The reinforcing member 132 is embedded (e.g., molded) within the elastomeric sleeve 142 adjacent to the nose portion 124 to provide a desired enhanced stiffness to the nose portion 124 for reasons previously described.

As illustrated, the nose portion 124 has a thickness "A," and the reinforcing member 132 is positioned a distance "B" from a front surface 125 of the nose portion. As with the embodiment of FIGS. 3 and 4, it has been determined, in accordance with the current invention, that providing the sleeve member 116 of FIGS. 7 and 8 with a B/A ratio of from about 20% to about 50% provides a desired enhanced life cycle for the sleeve. This ratio can vary, within the stated range, depending upon the elastomeric compound used to form the elastomeric sleeve 142, the pressure rating of the sleeve, and the thickness of the gate 40. Thus, exemplary B/A values, by nominal pipe size (NPS), are about 34% for 6 inch NPS, about 37% for 8 inch NPS, about 22% for 16-inch NPS, and about 48% for 32-inch NPS.

To provide an appropriate fit of the sleeve member 116 within the valve body 2, the outer surface 144 of the elastomeric sleeve 142 is sized and configured to engage at least a portion of an inner surface of the body.

Figure 10:
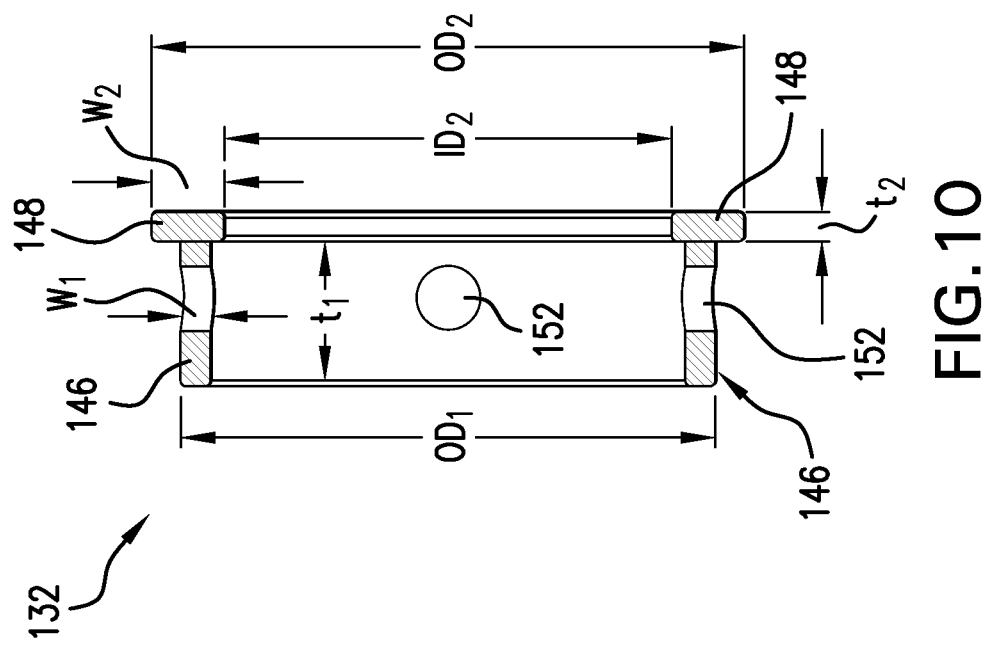
FIG. 10 is a cross-sectional view of the reinforcing member of FIG. 9, taken along line 10-10.
Figure 9:
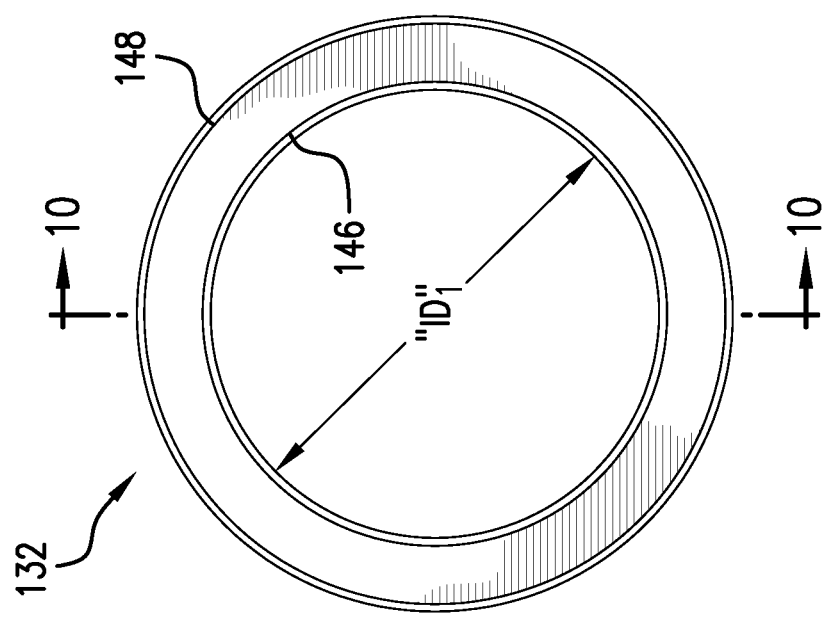
FIG. 9 is an end view of a reinforcing member of the sleeve seal of FIG. 7.

FIGS. 9 and 10 show isolated views of the reinforcing member 132. In the illustrated embodiment, the reinforcing member 132 is composed of a pair of elements, including first and second abutting ring members 146, 148 that have a generally T-shaped appearance in cross-section.

Each of the ring members 146, 148 has a respective inside diameter "$ID_1$, $ID_2$," a respective outside diameter "$OD_1$, $OD_2$," a width "$W_1$, $W_2$" and a thickness "$t_1$, $t_2$" sized to provide a desired degree of stiffness to the resulting sleeve member 116.

In the illustrated embodiment, the first ring member 146 also includes a plurality of holes 152 disposed therein. The holes 152 may facilitate alignment of the reinforcing member 132 within the mold during manufacture when the reinforcing member 132 is molded within the elastomeric sleeve 142.

As can best be seen in FIG. 8, the first and second ring members 146, 148 are positioned within the elastomeric sleeve 142 such that the second ring member 148 is directly adjacent to the nose portion 124 of the sleeve member 116. In this arrangement, a broad side surface 149 of the second ring member 148 is presented adjacent to the nose portion 124. In an alternative embodiment, the arrangement may be flipped such that the first ring member 146 is positioned adjacent to the nose portion 124 and the second ring member 148 is positioned on the opposite end of the first ring member, away from the nose portion 124. In such an alternative arrangement, a relatively more narrow side surface of the first ring member 146 is presented adjacent to the nose portion 124.

As with the first embodiment, the elastomeric sleeve 142 can be made of any of a variety of elastomeric materials used for fluid system applications. The reinforcing member 132 can be made from hot rolled steel, or other metal as appropriate. It is also contemplated that the reinforcing member 132 could be made from a non-metallic material such as a polymer.

Referring now to FIGS. 11-14, a third embodiment of a sleeve member 216 for use in the valve of FIGS. 1 and 2 is shown incorporating an alternative reinforcing arrangement. As with the previous embodiment, the description will proceed in relation to the first sleeve member 216, though the description applies equally to the second sleeve member.

The sleeve member 216 of FIGS. 11 and 12 comprises an elastomeric sleeve 242 in combination with a reinforcing member 232. In the illustrated embodiment, the nose portion 224, the flange portion 228 and the inner surface 220 are formed by the elastomeric sleeve 242. The reinforcing member 232 is embedded (e.g., molded) within the elastomeric sleeve 242 adjacent to the nose portion 224 to provide a desired enhanced stiffness to the nose portion 224 for reasons previously described.

As illustrated, the nose portion 224 has a thickness "A," and the reinforcing member 232 is positioned a distance "B" from a front surface 225 of the nose portion. As with the previously described embodiments, it has been found, in accordance with the current invention, that providing the sleeve member 216 of FIGS. 11 and 12 with a B/A ratio of from about 20% to about 50% provides a desired enhanced life cycle for the sleeve. This ratio can vary, within the stated range, depending upon the elastomeric compound used to form the elastomeric sleeve 142, the pressure rating of the sleeve, and the thickness of the gate 40.

To provide an appropriate fit of the sleeve member 216 within the valve body 2, the outer surface 244 of the elastomeric sleeve 242 is sized and configured to engage at least a portion of an inner surface of the body.

Figure 14:
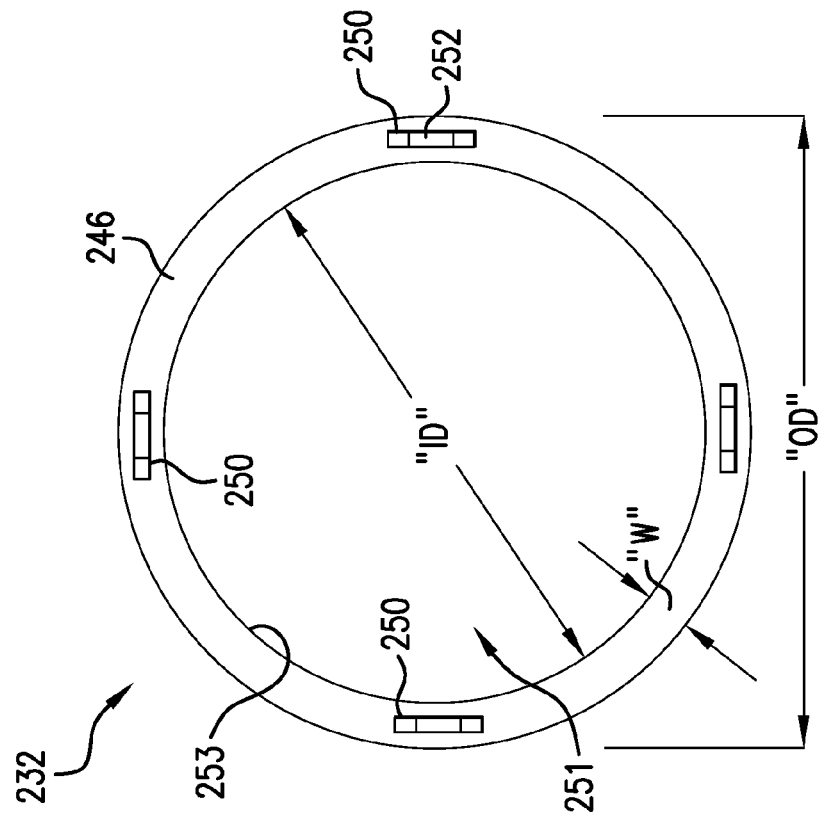
FIG. 14 is a cross-sectional view of the reinforcing member of FIG. 13, taken along line 14-14.
Figure 13:
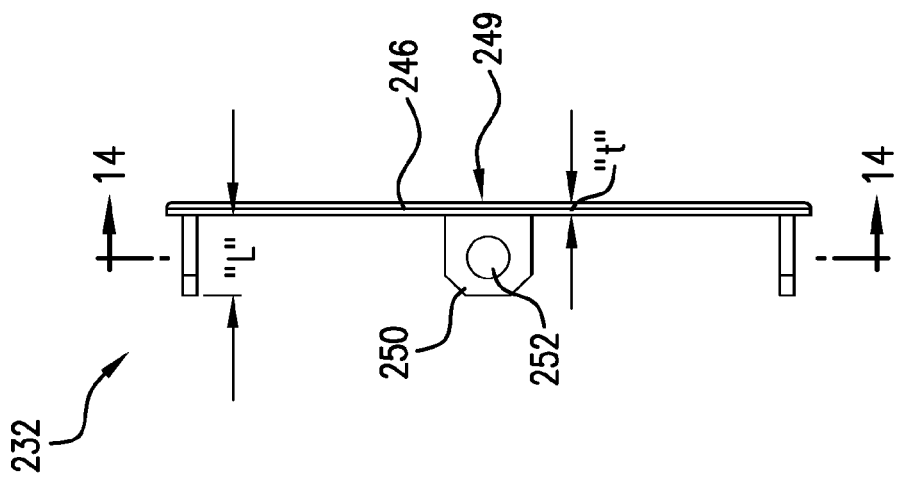
FIG. 13 is an end view of a reinforcing member of the sleeve seal of FIG. 11.

FIGS. 13 and 14 show isolated views of the reinforcing member 232. In the illustrated embodiment, the reinforcing member 232 is composed of a ring member 246 and a plurality of laterally-disposed spacer members 250. The spacer members each includes a hole 252 for facilitating alignment of the reinforcing member 232 within the mold during manufacture when the reinforcing member 232 is molded within the elastomeric sleeve 242.

Each of the spacer members has a length "L." In the illustrated embodiment, four individual spacer members 250 are shown positioned at 90-degree intervals. It will be appreciated that greater or fewer numbers of spacers can be used to provide a desired degree of axial stiffness to the sleeve member 216.

The ring member 246 has an inside diameter "ID" and an outside diameter "OD", a width "W" and a thickness "t" sized to provide a desired degree of stiffness to the resulting sleeve member 216. As can best be seen in FIG. 12, the reinforcing member 232 is positioned within the elastomeric sleeve 242 such that the ring member 246 is directly adjacent to the nose portion 224 of the sleeve member 216. In this arrangement, a broad side surface 249 (FIG. 13) of the ring member 246 is presented adjacent to the nose portion 224.

As with the previous embodiments, the elastomeric sleeve 242 can be made of any of a variety of elastomeric materials used for fluid system applications. The reinforcing member 232 can be made from hot rolled steel, or other metal as appropriate. It is also contemplated that the reinforcing member 232 could be made from a non-metallic material such as a polymer.

Referring now to FIGS. 15-19, a fourth embodiment of a sleeve member 316 for use in the valve of FIGS. 1 and 2 is shown incorporating a further alternative reinforcing arrangement. As with the previous embodiment, the description will proceed in relation to the first sleeve member 316, though the description applies equally to the second sleeve member.

Figure 16:
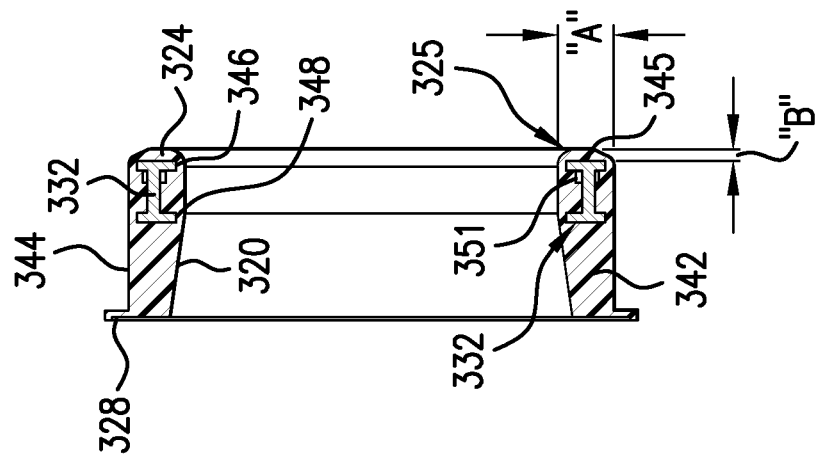
FIG. 16 is a cross-sectional view of the sleeve seal of FIG. 15, taken along line 16-16.
Figure 15:
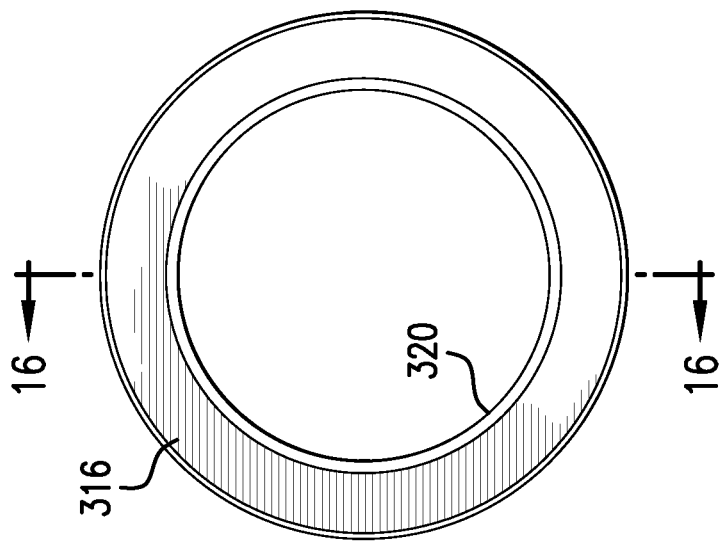
FIG. 15 is an end view of a fourth embodiment of the disclosed sleeve seal.

The sleeve member 316 of FIGS. 15 and 16 comprises an elastomeric sleeve 342 in combination with a reinforcing member 332. In the illustrated embodiment, the nose portion 324, the flange portion 328 and the inner surface 320 are formed by the elastomeric sleeve 342. The reinforcing member 332 is embedded (e.g., molded) within the elastomeric sleeve 342 adjacent to the nose portion 324 to provide a desired enhanced stiffness to the nose portion 324 for reasons previously described.

As illustrated, the nose portion 324 has a thickness "A," and the reinforcing member 332 is positioned a distance "B" from a front surface 325 of the nose portion. As with the previous embodiments, it has been found, in accordance with the current invention, that providing the sleeve member 316 of FIGS. 15 and 16 with a B/A ratio of from about 20% to about 50% provides a desired enhanced life cycle for the sleeve. This ratio can vary, within the stated range, depending upon the elastomeric compound used to form the elastomeric sleeve 142, the pressure rating of the sleeve, and the thickness of the gate 40.

To provide an appropriate fit of the sleeve member 316 within the valve body 2, the outer surface 344 of the elastomeric sleeve 342 is sized and configured to engage at least a portion of an inner surface of the valve body.

Figure 17:
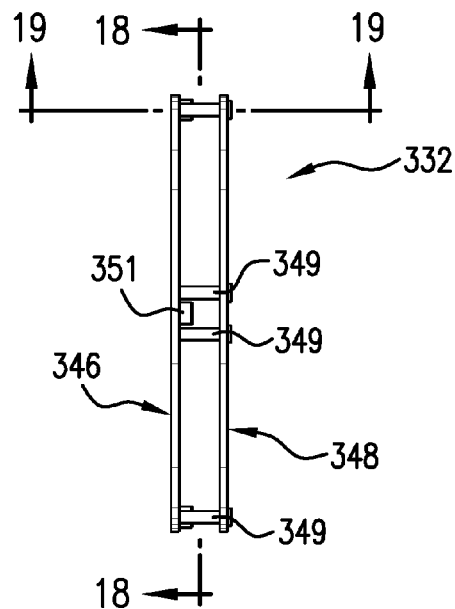
FIG. 17 is an end view of a reinforcing member of the sleeve seal of FIG. 15
Figure 18:
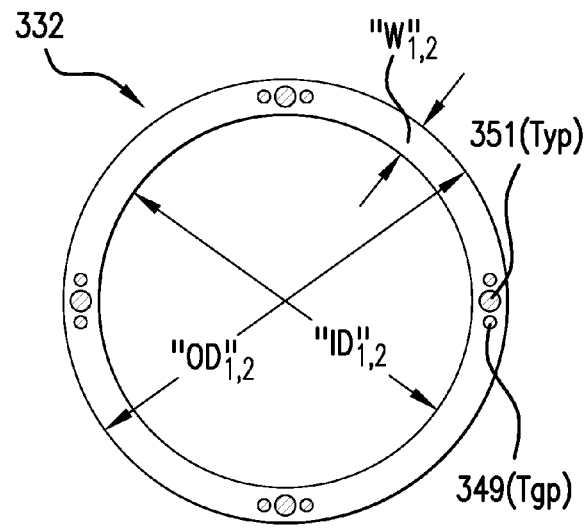
FIG. 18 is a cross-sectional view of the reinforcing member of FIG. 17, taken along line 18-18.
Figure 19:
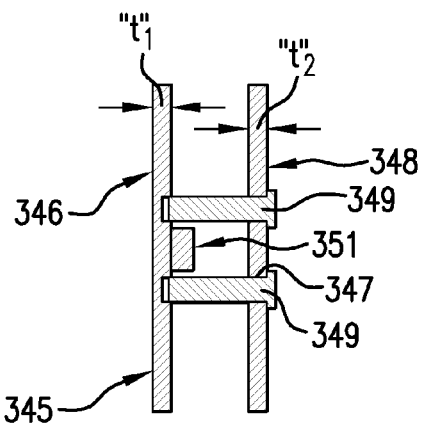
FIG. 19 is a further cross-sectional view of the reinforcing member of FIG. 17, taken along line 19-19.

FIGS. 17-19 show isolated views of the reinforcing member 332. In the illustrated embodiment, the reinforcing member 332 is composed of a plurality of elements, including first and second ring members 346, 348, a plurality of pins 349, and a plurality of spacer members 351.

Each of the ring members 346, 348 has a respective inside diameter "$ID_1$, $ID_2$," a respective outside diameter "$OD_1$, $OD_2$," a width "$W_1$, $W_2$" and a thickness "$t_1$, $t_2$" sized to provide a desired degree of stiffness to the resulting sleeve member 316.

In the illustrated embodiment, the first and second ring members 346, 348 are movable with respect to each other. This functionality is provided by the plurality of pins 349, which are fixed to the first ring 346, and which are slidably engaged with the second ring 348 via corresponding holes 347 in the second ring. In operation, the first and second rings 346, 348 can move with respect to each other via action of the first ring 348 which can slide along the pins 349. This provides a degree of flexibility to the reinforcing arrangement that allows the nose portion to flex a desired amount during cycling of the valve 1.

A plurality of spacer members 351 are provided on the first ring 346 to facilitate alignment of the reinforcing member 332 within the mold during manufacture when the reinforcing member 332 is molded within the elastomeric sleeve 342.

As can best be seen in FIG. 16, the first and second ring members 346, 348 are positioned within the elastomeric sleeve 342 such that the first ring member 346 is directly adjacent to the nose portion 324 of the sleeve member 316. In this arrangement, a broad side surface 345 of the second ring member 346 is presented adjacent to the nose portion 324. In an alternative embodiment, the arrangement may be flipped such that the second ring member 348 is positioned adjacent to the nose portion 324 and the first ring member 346 is positioned on the opposite end of the first ring member, away from the nose portion 324.

As with the previous embodiments, the elastomeric sleeve 342 can be made of any of a variety of elastomeric materials used for fluid system applications. The reinforcing member 332 can be made from hot rolled steel, or other metal as appropriate. It is also contemplated that the reinforcing member 332 could be made from a non-metallic material such as a polymer.

Referring now to FIGS. 20-23, a fifth embodiment of a sleeve member 416 for use in the valve of FIGS. 1 and 2 is shown incorporating a still further alternative reinforcing arrangement. As with the previous embodiment, the description will proceed in relation to the first sleeve member 416, though the description applies equally to the second sleeve member.

Figure 21:
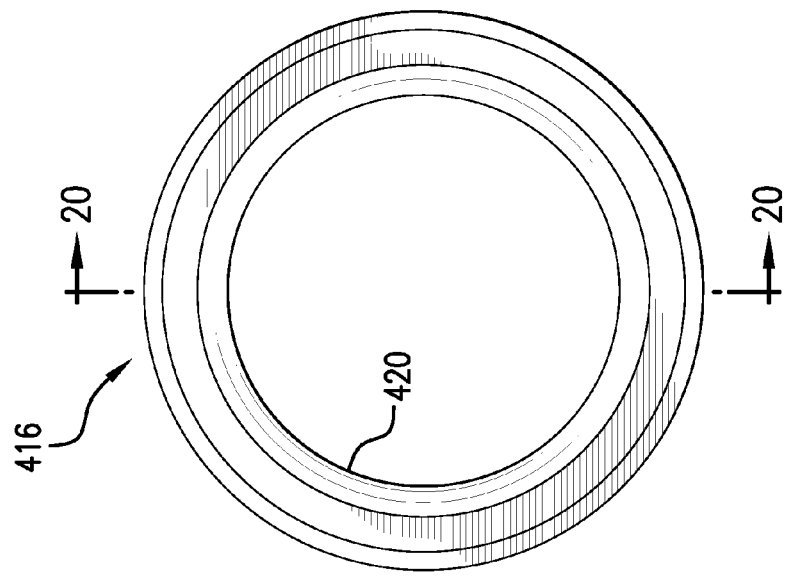
FIG. 21 is a cross-sectional view of the sleeve seal of FIG. 20, taken along line 20-20.
Figure 20:
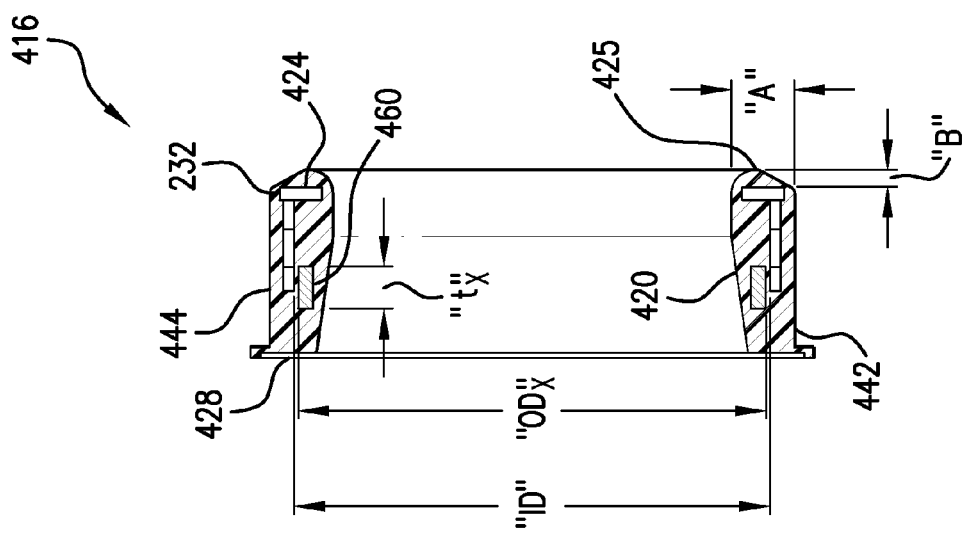
FIG. 20 is an end view of a fifth embodiment of the disclosed sleeve seal.

The sleeve member 416 of FIGS. 20 and 21 comprises an elastomeric sleeve 442 in combination with the reinforcing member 232 previously described in relation to FIGS. 11-14 and an auxiliary ring member 460 partially located within the reinforcing member 232. In the illustrated embodiment, the nose portion 424, the flange portion 428 and the inner surface 420 are formed by the elastomeric sleeve 442. The reinforcing member 232 is embedded (e.g., molded) within the elastomeric sleeve 442 adjacent to the nose portion 424 to provide a desired enhanced stiffness to the nose portion 424 for reasons previously described.

As illustrated, the nose portion 424 has a thickness "A," and the reinforcing member 232 is positioned a distance "B" from a front surface 425 of the nose portion 424. As with the previously described embodiments, it has been found, in accordance with the current invention, that providing the sleeve member 416 of FIGS. 20 and 21 with a B/A ratio of from about 20% to about 50% provides a desired enhanced life cycle for the sleeve. This ratio can vary, within the stated range, depending upon the elastomeric compound used to form the elastomeric sleeve 442, the pressure rating of the sleeve, and the thickness of the gate 40. Thus, exemplary B/A values, by nominal pipe size (NPS), are about 34% for 6 inch NPS, about 37% for 8 inch NPS, about 22% for 16-inch NPS, and about 48% for 32-inch NPS.

To provide an appropriate fit of the sleeve member 416 within the valve body 2, the outer surface 444 of the elastomeric sleeve 442 is sized and configured to engage at least a portion of an inner surface of the valve body 2.

Referring back to FIGS. 13 and 14, the ring member 246 of reinforcing member 232 includes an interior opening 251 having an inside diameter "ID" to form an interior surface 253, and an outside diameter "OD", a width "W" and a thickness "t" sized to provide a desired degree of stiffness to the resulting sleeve member 416 (FIG. 20). As can best be seen in FIG. 20, the reinforcing member 232 is positioned within the elastomeric sleeve 442 such that the ring member 246 is directly adjacent to the nose portion 424 of the sleeve member 416. In this arrangement, a broad side surface 249 (FIG. 13) of the ring member 246 is presented adjacent to the nose portion 424.

Figure 23:
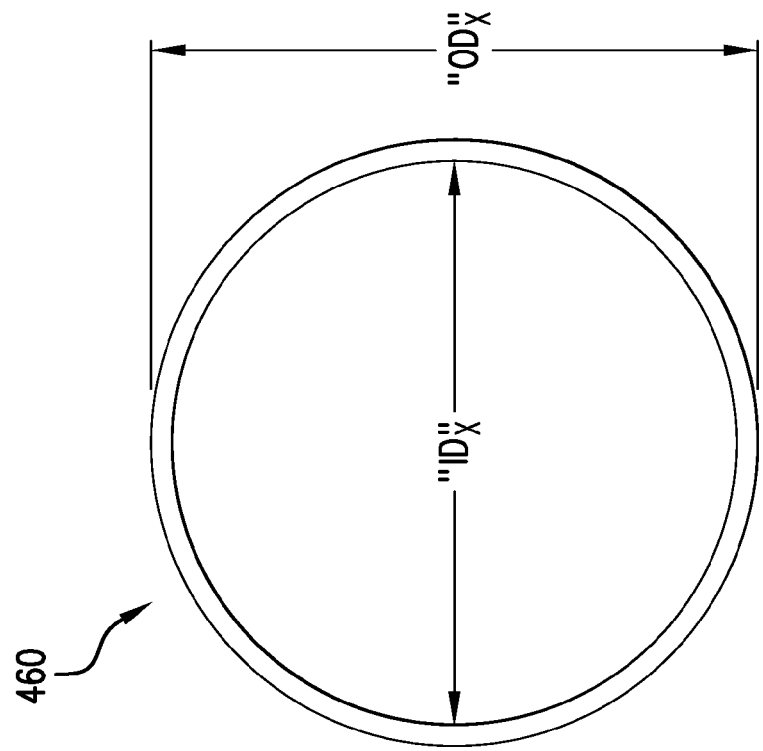
FIG. 23 is an end view of the auxiliary ring member of FIG. 22.
Figure 22:
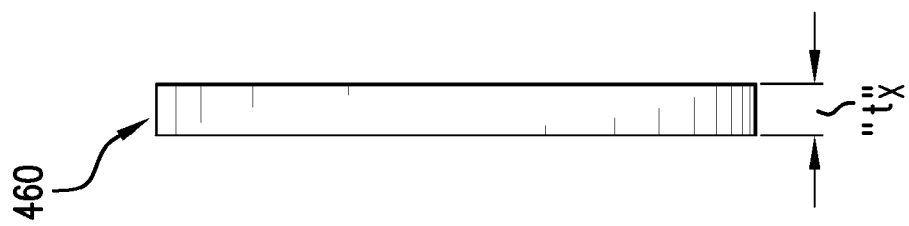
FIG. 22 is a side view of an auxiliary ring member of the sleeve seal of FIG. 20.
Figure 24A:
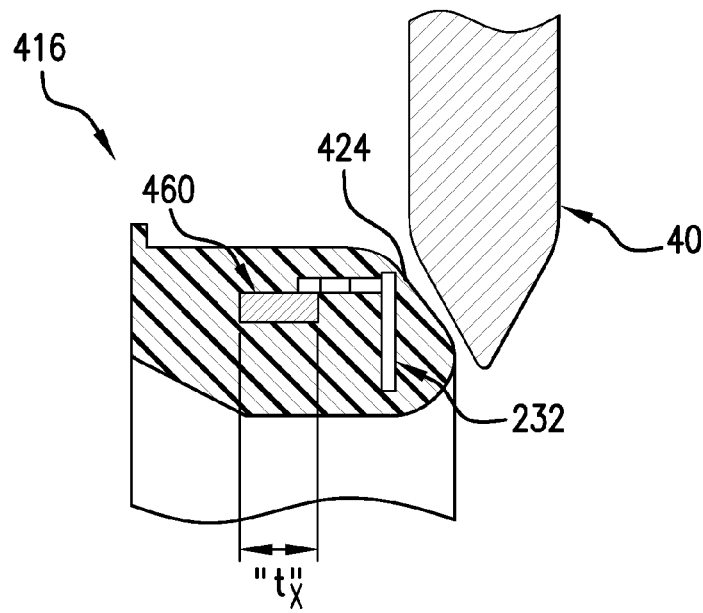
FIGS. 24A-24B depict partial cross sectional views of a gate in open and closed positions and a sleeve member in accordance with the fifth embodiment of the current invention.
Figure 24B:
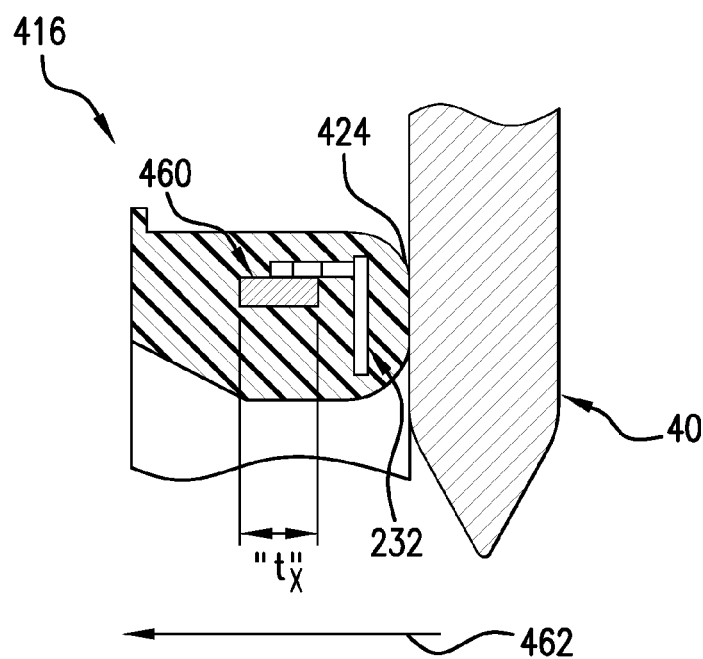

Referring to FIGS. 22 and 23, the auxiliary ring member 460 has a ring shape and includes an inside diameter "$ID_x$," and an outside diameter "$OD_x$," forming an outer surface 464 and a thickness "$t_x$". Referring to FIGS. 20 and 21, the outside diameter $OD_x$ of the auxiliary ring member 460 is smaller than the inside diameter ID of the interior opening 251 of the reinforcing member 232. The auxiliary ring member 460 is embedded (e.g. molded) within the elastomeric sleeve 442 and located such that a portion of the thickness $t_x$ is positioned within the interior opening 251 of the reinforcing member 232 thereby forming a slip fit arrangement between the reinforcing member 232 and the auxiliary ring member 460. In this embodiment, the reinforcing member 232 and auxiliary ring member 460 are moveable with respect to each other in an axial direction. Operation of the current embodiment will now be described with reference to FIGS. 24A and 24B in conjunction with the description accompanying FIGS. 1 and 2. FIGS. 24A and 24B depict partial cross sectional views of the gate 40 and sleeve member 416. When the valve 1 is open (FIG. 24A), the gate 40 does not compress the sleeve member 416 (only a partial view of a sleeve member 416 is shown for clarity). When the valve 1 is closed, the gate 40 compresses the nose portion 424 thus causing axial deflection of the reinforcing member 232 and auxiliary ring member 460 along an axial direction 462 of the valve 1 (FIG. 24B). In accordance with the present invention, the reinforcing member 232 deflects a greater amount than the auxiliary ring member 460 along the center axis. Therefore, a greater portion of the thickness $t_x$ of the auxiliary ring member 460 is positioned within the interior opening 251 of the reinforcing member 232 than when the nose portion 424 is not compressed. The auxiliary ring member 460 provides additional stiffness in the axial direction for the elastomeric sleeve 442 along with increased hoop strength for the elastomeric sleeve 442. As such, the arrangement of the fifth embodiment is suitable for high pressure applications.

As with the previous embodiments, the elastomeric sleeve 442 may be made of any of a variety of elastomeric materials used for fluid system applications. The reinforcing member 232 and/or auxiliary ring member 460 may be made from hot rolled steel, or other metal as appropriate. It is also contemplated that the reinforcing member 232 and/or auxiliary ring member 460 could be made from a non-metallic material such as a polymer.

It will be appreciated that the features disclosed in this specification (including any accompanying claims, abstract and drawings), may be combined in any combination, and that each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A gate valve sleeve, comprising:
   a cylindrical sleeve member having a nose portion disposed at one end; and
   a reinforcing member substantially completely encased within the cylindrical sleeve member, the reinforcing member comprising first and second spaced apart ring members connected by a plurality of spacer members;
   wherein one of the first and second spaced apart ring members is positioned adjacent to the nose portion.

2. The gate valve sleeve according to claim 1, wherein the cylindrical sleeve member is fabricated from an elastomeric material and the reinforcing member is fabricated from metal.

3. The gate valve sleeve according to claim 2, wherein the spacer members are spaced at ninety degree intervals.

4. The gate valve sleeve according to claim 1, wherein the reinforcing member is positioned a first axial distance away from a surface of the nose portion such that a ratio of the first axial distance and a thickness of the nose portion is in a range of about 20% to about 50%.

5. A gate valve sleeve, comprising:
   a cylindrical sleeve member having a nose portion disposed at one end; and
   a reinforcing member disposed within the cylindrical sleeve member, the reinforcing member comprising first and second ring members abutted to form a T-shape in cross-section;
   wherein the second ring member is arranged such that a broad side surface of the second ring member is positioned adjacent to and facing the nose portion.

6. The gate valve sleeve according to claim 5, wherein the reinforcing member is positioned a first axial distance away from a surface of the nose portion such that a ratio of the first axial distance and a thickness of the nose portion is in a range of about 20% to about 50%.

7. A gate valve sleeve, comprising:
   a cylindrical sleeve member having a nose portion disposed at one end; and
   a reinforcing member substantially completely encased within the cylindrical sleeve member, the reinforcing member comprising a ring member engaged with a plurality of axially oriented spacer members;
   wherein the reinforcing member is positioned a first axial distance away from a surface of the nose portion such that a ratio of the first axial distance and a thickness of the nose portion is in a range of about 20% to about 50%.

8. The gate valve sleeve according to claim 7, wherein the cylindrical sleeve member is fabricated from an elastomeric material and the reinforcing member is fabricated from metal.

9. The gate valve sleeve according to claim 8, wherein the spacer members are spaced at ninety degree intervals.

10. A gate valve sleeve, comprising:
    a cylindrical sleeve member having a nose portion disposed at one end; and
    a reinforcing member substantially completely encased within the cylindrical sleeve member, the reinforcing member comprising first and second spaced apart ring members connected by a plurality of pins, the first spaced apart ring member fixed to the plurality of pins and the second spaced apart ring member slidably engageable with said plurality of pins;
    wherein one of the first and second spaced apart ring members is positioned adjacent to the nose portion.

11. The gate valve sleeve according to claim 10, wherein the reinforcing member is positioned a first axial distance away from a surface of the nose portion such that a ratio of the first axial distance and a thickness of the nose portion is in a range of about 20% to about 50%.

12. The gate valve sleeve according to claim 10, wherein the cylindrical sleeve member is fabricated from an elastomeric material and the reinforcing member is fabricated from metal.

13. A gate valve sleeve, comprising:
    a cylindrical sleeve member having a nose portion disposed at one end;
    a reinforcing member and an auxiliary ring member disposed within the cylindrical sleeve member, the reinforcing member including a ring member engaged with a plurality of axially oriented spacer members and the ring member including an interior opening forming an interior surface and wherein the auxiliary ring member includes an outer surface located within the interior opening to form a slip fit arrangement between the reinforcing member and the auxiliary ring member.

14. The gate valve sleeve according to claim 13, wherein the reinforcing member is positioned a first axial distance away from a surface of the nose portion such that a ratio of the first axial distance and a thickness of the nose portion is in a range of about 20% to about 50%.

15. The gate valve sleeve according to claim 13, wherein the cylindrical sleeve member is fabricated from an elastomeric material and the reinforcing member is fabricated from metal.

* * * * *